Nov. 28, 1967          H. T. HSIA          3,354,645
METHOD AND APPARATUS FOR PRODUCING A NON-AXIAL THRUST VECTOR
Filed Jan. 3, 1966
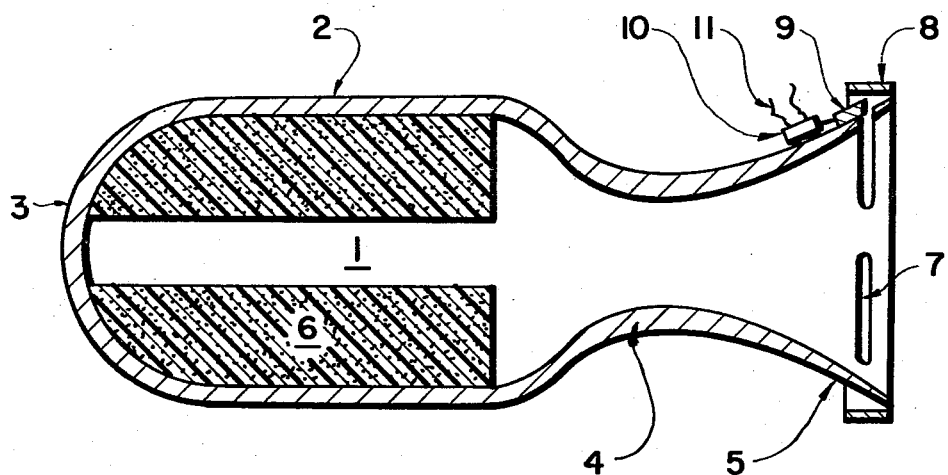
INVENTOR.
HENRY T. HSIA
BY
ATTORNEY 3,354,645
METHOD AND APPARATUS FOR PRODUCING A NON-AXIAL THRUST VECTOR
Henry T. Hsia, Sunnyvale, Calif., assignor to United Aircraft Corporation, East Hartford, Conn., a corporation of Delaware
Filed Jan. 3, 1966, Ser. No. 518,318
6 Claims. (Cl. 60—204)

ABSTRACT OF THE DISCLOSURE

A system for producing non-axial thrust vectors in a rocket exhaust stream by secondary injection of ambient air into the exhaust stream to cause a shock which produces an unsymmetrical pressure distribution within the nozzle. The air is inducted through ports in the nozzle wall which are located at a point along the nozzle at which the exhaust stream is overexpanded. Since the pressure within the nozzle at such a point is less than ambient, ambient air can be used as the injectant medium.

---

This invention relates generally to thrust vector control, and more particularly to an apparatus and method for producing a non-axial thrust vector from a reaction motor by means of injection of ambient air.

In order to maneuver reaction motor propelled vehicles, it is sometimes necessary to provide a thrust component which is displaced with respect to the longitudinal axis of the vehicle. Several means for accomplishing this are known in the art. For example, deflecting vanes may be located in the exhaust stream, the reaction motors or their nozzles may be gimballed so that motion about the longitudinal axis of the vehicle is possible or a liquid or a gas may be injected into the exhaust stream to produce an unsymmetrical pressure distribution within the divergent nozzle. This latter technique has been proven quite successful and is currently employed in many major rocket propulsion systems. One of the big disadvantages of the secondary injection thrust vector control systems is the requirement for carrying the necessary supply of injectant medium on the rocket vehicle. The extra weight of the tankage and the injectant fluid required can be substantial in large rocket motor systems and, accordingly, reduces the effective payload of the device. This problem has been recognized and U.S. Patent No. 2,943,821, Wetherbee, July 5, 1960, discloses a thrust vector control system wherein ram air is used as the injectant medium to produce a shock in the nozzle of a reaction motor which causes a nonsymmetrical pressure distribution within the nozzle. In such a system, when the rocket operates within the atmosphere, it is surrounded by an unlimited supply of the injectant medium which is available for use in the thrust vector control means as a result of the ram effect caused by the motion of the vehicle through the atmosphere. Such a system is particularly advantageous in that it does away with the need for carrying the injectant fluid and the associated tankage on board the vehicle. The one disadvantage of the system, however, is that it relies upon a ram effect to supply the thrust vector control medium when needed. Therefore, when the vehicle is at rest, as when it is initially being launched from a launching pad, there is no thrust vector control fluid available for control during initial phases of the flight. Since during this initial launch period it is essential to have effective thrust vector control means for initial stability of the vehicle during launching, the Wetherbee system must either be used only in a reaction motor system which will be moving when it is launched, as for example when the rocket device is launched from a moving airplane, or in the alternative must incorporate some additional control means to supply control during the initial launch stage of the flight. This invention, however, produces a nonaxial thrust vector by means of ambient air which functions when the reaction motor is at rest with respect to the atmosphere. This invention therefore is readily adaptable for use in a thrust vector control system that thereby eliminates the need for carrying the thrust vector control fluid on board and at the same time provides control during the initial launch phase. In addition this invention has particular utility in research and experimental work in the development of effective means for producing nonaxial thrust vector.

Therefore, it is an object of the invention to provide a system for producing a nonaxial thrust vector in a reaction motor exhaust by means of ambient air.

It is another object of this invention to provide a method for producing a nonaxial thrust vector in a reaction motor exhaust which employs ambient air and which functions without the necessity of a ram effect between the reaction motor and the atmosphere.

These and other objects of this invention will be readily apparent from the following description with reference to the accompanying drawing wherein the figure is a cross-section view of a reaction motor capable of producing a non-axial thrust vector according to this invention.

It has been found that a non-axial thrust vector can be obtained by means of ambient air without the necessity of utilizing a ram effect and without seriously degrading the performance of a rocket system if the air injection port is located at a point along the divergent portion of the nozzle within which the exhaust gas is overexpanded with respect to ambient conditions. For a vertical launch from zero velocity, the nozzle is overexpanded at lift-off conditions. A flow of ambient atmospheric pressure air is thereby provided through the injection port since the internal pressure is sub-atmospheric. This port would preferably be slightly upstream of the exit plane of the slightly overexpanded nozzle. As the rocket accelerates, the altitude increases and the ambient pressure decreases; and the ram effect can be utilized to provide the injectant medium.

A specific embodiment of a rocket motor utilizing the invention is shown in the figure wherein reference numeral 1 represents a rocket motor which for purposes of illustration is shown as being a solid fuel rocket motor, however, it is apparent that this invention can be employed with any type of reaction motor. The motor 1 comprises a casing 2 defining a forward closure 3, a convergent-divergent nozzle having a throat portion 4 and a divergent portion 5. A solid propellant grain 6 is located within casing 7. A plurality of injection ports 7 are provided in the divergent portion 5 adjacent the exit plane thereof and at an overexpanded nozzle area ratio. The ports 7 are preferably uniformly distributed around the circumference of the divergent portion 5 and should be directed upstream to enhance the localized pressure increase. A shroud 8 may be mounted on the nozzle at the exit plane thereof, which shroud will function to produce a ram effect when the rocket is moving through the atmosphere to force air into ports 7. A sliding valve member 9 is mounted on the nozzle extension and is adapted to slide from a first position as shown where it does not obstruct port 7 to a second position wherein it does obstruct port 7. A sliding member 9 is provided for each of the ports 7. Suitable actuating means which may be a hydraulic actuator 10 are mounted on the divergent portion 5 and connected to sliding member 9 to provide actuation thereof.

e actuator 10 is connected by pipes 11 to a suitable rce of hydraulic fluid, not shown. An actuator 10 is vided for each of the sliding members 9. The actus respond to signals generated in a guidance system is well known in the art.

Two modes of operation are possible. In the first mode sliding members 9 are located so that the injection rts 7 are blocked during that portion of the motor rning time when directional control is not needed. hen directional control in a particular direction is reired, the actuator 10 moves the appropriate sliding ember 9 to the open position which permits air to be ducted through port 7 and thereby raising the pressure the vicinity of port 7 to produce a directional thrust tor in the direction corresponding to the port's location. When the directional control is no longer required, e sliding member 9 is moved again to its closed position.

The other mode of operation consists of maintaining l the sliding members 9 in the open position so that air constantly inducted through all the ports when no irectional control is required. Since the ports are unimly distributed, the pressure increase is directionally alanced and a thrust augmentation effect can be produced. When directional control in one direction is required, the sliding members of the ports opposite those which the directional force is required are closed thereby raising the pressure in the vicinity of the remaining pen ports. The use of ports and sliding members to conrol the induction of ambient air as shown in the figure merely illustrative and it is readily apparent that ther means known to the art can be used to obtain the esired result. For example, rather than using slot-like orts, a plurality of ports with suitable valve means such s illustrated in the Wetherbee patent can be employed nstead. Also, various other types of valves which would perate under the conditions can be used to control the nflux of ambient air. For example, rather than using a liding member as shown in the figure, a louvre type alve could be employed with the louvres pivotable from a first position in which ambient air is inducted substantially parallel to the escaping gas stream to a second position where the ambient air is inducted at an angle to the escaping gas stream such that the air has a velocity component upstream of the escaping gas stream. In operation of such a system all the louvres would be adjusted to the first position when directional control was not required and thrust augmentation could be produced and a selected set of louvres moved to the second position to enhance the localized pressure increase when thrust vector control in the associated direction is required.

A specific example of the forces generated according to this invention are set forth below.

*Example 1*

A rocket motor was provided with a 120° slot 0.188 inch wide on the exit cone at a nozzle expansion ratio of 13.6 to 1.0. The slot was inclined at 45° to the nozzle axis so that air being inducted had a velocity component direct upstream. The nozzle had a half angle of 15°, a throat dimension of 1.04 inches, and a total expansion ratio of 15.4 to 1.0. During the first portion of firing of a slightly regressive burning solid grain, the circumferential slot was covered. Then the slot was uncovered and the side thrust and axial force measured during the whole duration of firing. The results of the test are set forth below in Table I.

TABLE I

| | Slot Covered | Slot Open Air Inducted | |
|---|---|---|---|
| | | Initial | Final |
| $p_c$, chamber pressure (p.s.i.g.) | 630.00 | 587.000 | 485.000 |
| $F_s$, side force (lb.) | 1.20 | 27.500 | 26.000 |
| $F_o$, axial thrust (lb.) | 735.00 | 697.000 | 548.000 |
| $W_o$, flow rate of rocket exhaust (lb./sec.) | 3.54 | 3.300 | 2.660 |
| $W_a$, flow rate of air | 0.00 | .218 | .218 |
| $W_a/W_o$ | 0.00 | .066 | .082 |
| Thrust deflection angle (degree) | | 2°20′ | 2°45′ |
| Slide specific impulse (lb. f.-sec./lb. m.) | | 126.000 | 119.000 |

The results of this test establish that a substantial non-axial thrust vector can be produced by means of ambient air when a rocket motor is at rest and when the injectant port is located at an overexpanded nozzle ratio and that the side force can be produced without a substantial length of exit cone downstream from the injection port.

This invention has been described with respect to certain specific embodiments thereof, but the disclosure should not be considered as limiting thereto. Various changes and modifications may be made in these embodiments without departing from the scope of this invention which is limited only by the following claims.

I claim:

1. In a method for producing a non-axial thrust vector from a reaction motor which comprises exhausting gases through a convergent-divergent nozzle and injecting air into said gases at a portion of the periphery of the divergent portion of said nozzle whereby an unsymmetrical pressure distribution is produced within said divergent portion, the improvement which comprises inducting said air into said divergent portion at a point along said divergent portion wherein said gases are overexpanded.

2. A reaction motor capable of producing a non-axial thrust vector comprising a source of pressurized gas, convergent-divergent nozzle means for exhausting said gas and expanding said gas to a pressure less than ambient, means for injecting ambient air into said gas at a point within the divergent portion of said nozzle at which said gases are overexpanded and means for selectively controlling the flow of air through said means for injecting ambient air.

3. The method of claim 1 wherein said point is in close proximity to the exit plane of said divergent portion.

4. The reaction motor of claim 2 wherein said means for injecting ambient air is in close proximity to the exit plane of said divergent portion.

5. The method of claim 1 wherein said air is inducted with a velocity component directed upstream with respect to said gases.

6. The reaction motor of claim 2 wherein said means for injecting ambient air are disposed at an acute angle with respect to the longitudinal axis of said reaction motor whereby inducted air has a velocity component directed upstream.

References Cited

UNITED STATES PATENTS

| 2,943,821 | 7/1960 | Wetherbee | 60—231 |
| 3,036,430 | 5/1962 | Eggers et al. | 239—265.23 |
| 3,066,485 | 12/1962 | Bertin et al. | 60—231 |
| 3,144,752 | 8/1964 | Kepler | 60—231 X |
| 3,268,175 | 8/1966 | Hausmann | 60—231 X |

CARLTON R. CROYLE, *Primary Examiner.*